United States Patent
Zuykov et al.

(10) Patent No.: US 8,923,815 B1
(45) Date of Patent: Dec. 30, 2014

(54) METHOD FOR DETECTING CHANGES IN SECURITY LEVEL IN MOBILE NETWORKS

(71) Applicant: Konstantin Saprygin, Moscow (RU)

(72) Inventors: Alexander Zuykov, Moscow (RU);
Sergey Kharkov, Moscow (RU);
Dmitry Mikhailov, Moscow (RU)

(73) Assignee: Konstantin Saprygin, Moscow (RU)

( * ) Notice: Subject to any disclaimer, the term of this patent is extended or adjusted under 35 U.S.C. 154(b) by 0 days.

(21) Appl. No.: 14/064,148

(22) Filed: Oct. 27, 2013

(51) Int. Cl.
*H04W 24/04* (2009.01)
*H04M 1/66* (2006.01)

(52) U.S. Cl.
CPC .................................. *H04W 24/04* (2013.01)
USPC .......................................... 455/410; 455/411

(58) Field of Classification Search
CPC .............................. H04W 12/00; H04W 12/02
USPC .................................................. 455/410, 411
See application file for complete search history.

(56) References Cited

U.S. PATENT DOCUMENTS

| | | | |
|---|---|---|---|
| 7,068,999 B2* | 6/2006 | Ballai | 455/411 |
| 7,257,107 B2* | 8/2007 | Swier et al. | 370/338 |
| 7,577,423 B2* | 8/2009 | Tang | 455/410 |
| 7,676,218 B2* | 3/2010 | Ballai | 455/411 |
| 7,995,994 B2* | 8/2011 | Khetawat et al. | 455/410 |
| 8,000,698 B2* | 8/2011 | Wolman et al. | 455/423 |
| 8,387,141 B1* | 2/2013 | Zhukov et al. | 726/22 |
| 8,457,594 B2* | 6/2013 | Stevens et al. | 455/410 |
| 8,655,312 B2* | 2/2014 | Stahlberg et al. | 455/410 |
| 8,707,432 B1* | 4/2014 | Rathi et al. | 726/23 |
| 8,750,267 B2* | 6/2014 | Aggarwal et al. | 370/338 |
| 8,782,740 B1* | 7/2014 | Sarra et al. | 726/3 |
| 2003/0186679 A1* | 10/2003 | Challener et al. | 455/410 |
| 2004/0023640 A1* | 2/2004 | Ballai | 455/411 |
| 2004/0049699 A1* | 3/2004 | Griffith et al. | 713/201 |
| 2008/0295144 A1* | 11/2008 | Cam-Winget et al. | 726/1 |
| 2009/0104889 A1* | 4/2009 | Lotvonen et al. | 455/410 |
| 2012/0173609 A1* | 7/2012 | Kulaga et al. | 709/203 |
| 2013/0040603 A1* | 2/2013 | Stahlberg et al. | 455/410 |
| 2013/0070744 A1* | 3/2013 | Baek et al. | 370/338 |
| 2013/0344844 A1* | 12/2013 | Goldfarb | 455/411 |

* cited by examiner

*Primary Examiner* — Jinsong Hu
*Assistant Examiner* — Jean Chang
(74) *Attorney, Agent, or Firm* — Bardmesser Law Group

(57) ABSTRACT

A system and method for detecting changes in security level of mobile networks. The system can be used with any mobile devices having a network module or a Wi-Fi module, such as mobile phones, tablets, notebooks, navigation systems, monitoring devices, etc. The system processes data sent and received by the mobile devices and detects connections to unauthorized base stations (UBSs). The exemplary system can also control mobile device battery charge, capacity of connection components, reading of accelerometers, etc.

22 Claims, 8 Drawing Sheets

METHOD FOR DETECTING CHANGES IN SECURITY LEVEL IN MOBILE NETWORKS

BACKGROUND OF THE INVENTION

1. Field of the Invention

The present invention is related to mobile networks and, in particular, to a method and system for analyzing transmitted data and determining changes in security level of data transmission in mobile networks.

2. Description of the Related Art

Modern mobile networks have become more complex with increasing number of mobile users and base stations. This can cause several undesirable effects, such as:

- changes in communication quality;
- connections to an unauthorized (un-trusted) base station;
- shortened time of a battery operation of a mobile phone;
- establishing un-trusted (unauthorized) connections (for voice and packet data);
- mobile network errors and failures; and
- wrong data received from a base station.

Conventional systems do not provide an effective means for dealing with the above problems. The conventional mobile networks do not collect and analyze operational statistics for controlling the communications security. The network operators can collect some statistics, but there is no system that aggregates comprehensive data from different operators.

Accordingly, a method and system for efficient and effective system for analyzing the mobile network for security is desired.

SUMMARY OF THE INVENTION

The present invention is related to mobile networks and, in particular, to a method and system for analyzing data and determining changes in security level of data transmission in mobile networks that substantially obviates one or several of the disadvantages of the related art.

In one aspect of the invention, a system and method for analyzing mobile networks are provided. The exemplary system can be used with any mobile devices having a network module or a Wi-Fi module, such as mobile phones, tablets, notebooks, navigation systems, monitoring devices, etc. According to the exemplary embodiment, the system processes data sent and received by the mobile devices. The exemplary system can also control mobile device battery charge, capacity of connection components, reading of accelerometers, etc.

The data can be processed and stored on the mobile device or it can be sent to a remote server. The collected data provides for detailed statistics that can be used for analysis of a mobile network. For example, the handover (switch between the base stations) can be analyzed. The collected mobile network data can be stored in a special database. The data can be used for creating coverage maps, where base stations (BSs) and Wi-Fi access points are tied to coordinates of the BS or of the mobile device (i.e., a mobile terminal MT). A map reflecting BSs' signal levels of different operators can be generated as well. The data reflecting network failures can be also created.

The analysis of collected mobile network statistics allow for making decisions for future development and mobile network architecture based on reliable data. According to one embodiment, the collected mobile network data is analyzed in real time. The changes of some key parameters are detected and appropriate actions can be taken. The system can also detect the MT connected to unauthorized base stations (UBS).

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
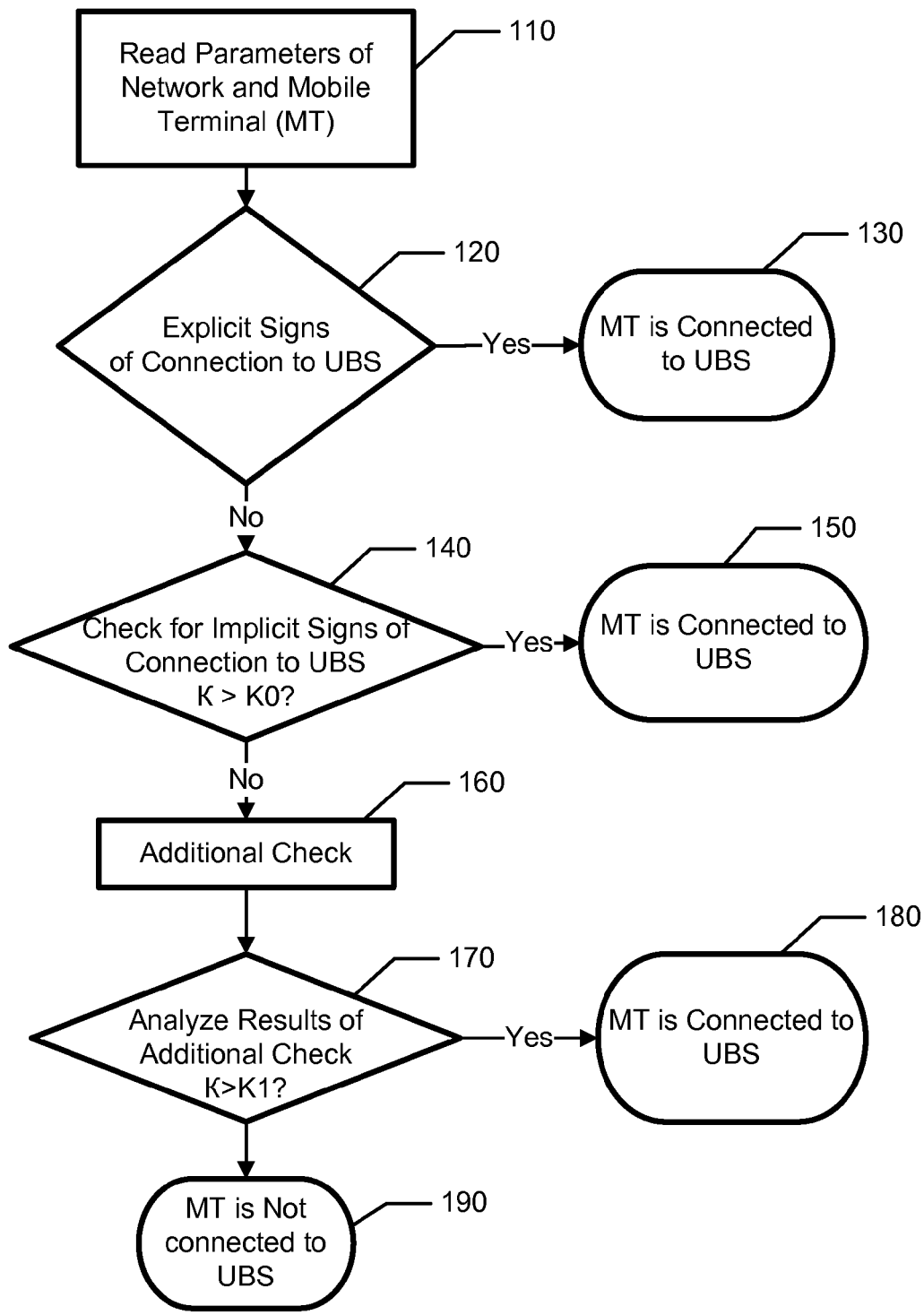
FIG. 1 illustrates a flow chart of an algorithm for detecting unauthorized base station (UBS), in accordance with the exemplary embodiment.

Reference will now be made in detail to the preferred embodiments of the present invention, examples of which are illustrated in the accompanying drawings.

According to the exemplary embodiment, a method, system and computer program product for analyzing mobile communications networks are provided. The exemplary system can be used with any mobile devices having a network module or a Wi-Fi module, such as mobile phones, tablets, notebooks, navigation systems, monitoring devices, devices for controlling parameters of the network etc. According to the exemplary embodiment, the system processes data sent and received by the mobile devices.

The exemplary system can also control and manage mobile device battery charge (and collect statistics), capacity of connection components, reading of accelerometers, etc. The exemplary system collects data related to the mobile connections: a time and a location of a connection failure; network parameters prior to the connection failure; network parameters after the connection failure; and changes of mobile communication standards and conditions of these changes. The exemplary system can periodically survey mobile terminal (MT) microphone for its availability. If the microphone is not available, the system checks an MT user interface for messages indicating microphone-related issues. If the microphone is not available, this can indicate a hidden call. If the microphone active, the sound recording is present.

The data can be processed and stored on the mobile device or it can be sent to a remote server for further analysis. The collected data provides detailed statistics that can be used for analysis of a mobile network. For example, the handover (switch between the base stations) can be analyzed. The collected mobile network data can be stored in a special database. The data can be used for creating coverage maps, where base stations (BSs) and Wi-Fi access points are tied to coordinates of the BS or of the mobile device (i.e., a mobile terminal—MT). A map reflecting BSs' signal levels of different operators can be generated as well. A data set reflecting network failures can be also generated.

The analysis of collected mobile network statistics allow for making decisions for future development and mobile network architecture based on reliable data. According to one embodiment, the collected mobile network data is analyzed in real time. The changes of some key parameters are detected and appropriate actions can be taken. For example:

1. MT finds more than one BS with the same identifiers in its surrounding area. The system can analyze this data and detect an unauthorized BS (UBS), which does not belong to real service provider. The UBS can be a virtual BS, which intercepts on the voice communications and/or intercepts the text messages. The UBS can send malware to the user MT and can acquire MT identifications or SIM card data. The UBS can operate in active, semi-active and passive modes. In either case, the UBS needs to be detected.

2. Encryption between the BS and MT has been turned off and the voice data can be intercepted by third parties. The system detects this security violation.

Subsequently, the system uses additional mobile network data and implements security procedures in order to protect the MT and its user. The user can be informed about the security risks and a mode of operation of the MT can be changed. The appropriate strategies can be implemented with the user participation or automatically. For example:

a. The MT enters a zone with no coverage by the mobile operator. The system reduces a load sent to a modem;

b. The MT connects to the UBS. The user or system operator is informed about unauthorized connection.

According to the exemplary embodiment, the system monitors 2G, 3G, 4G/LTE and Wi-Fi networks. The system collects data for local and centralized processing (analysis). The system determines most probable causes and consequences of changes in the mobile networks based on special algorithms for data analysis. The monitoring and analysis of structured mobile network data allows for tracking changes in the network currently serving the MT. The MT user is informed and the notifications are sent to the remote server in cases of any of the undesired events:

changes in communication quality (i.e., switching between 2G-3G-4G causes changes in signal, increased number of incorrect packets, etc.);

connections to an unauthorized (un-trusted) base station;

shortened time of a battery operation (if the battery discharges faster than normal, it can indicate a hidden connection);

establishing un-trusted (unauthorized) connections (for voice and packet data);

mobile network errors and failures; and wrong data (or data that does not correspond to the BS) received from the BS, etc.

If any of the above events are detected, a special set of instructions is executed. The instructions can be pre-set or can be dynamically generated based on the additional parameters acquired by the system. According to the exemplary embodiment, the security system performs the following function implemented by separate modules:

1. Control of a quality of the mobile connections and control of a state of the MT;

2. Control of the authenticity and security of mobile connections;

3. Control of the authenticity of the Wi-Fi connections.

The module for control of the quality of the mobile connections performs monitoring of the mobile connection. The quality control module collects the statistics of the events that affect the quality of the mobile connection between the user MTs or modem-connected devices and the mobile operators. The collected data reflects the state of the MT as well. The collected data is used for:

assembling a statistics database of the BSs of mobile operators, including the signal levels;

generation of an exact coverage map for the mobile network and/or for the Wi-Fi network;

assembling network error statistics database (such as incorrect operation of the MT with an authorized service provider. For example, incorrect completion of a call, switch to another BS upon completion of a call, not switching to another BS with a better signal quality, etc.);

analysis of behavior of the MT and correctness of its operational algorithms.

The module for control of the authenticity and security of the mobile connections collects statistical data indicating substitutions of the BS by the UBS. This module also detects the insecure data transmissions and the UBSs. In order to detect a UBS, explicit and implicit signs are used. Thus, the control module also serves as a statistics collection module configured to collect the mobile network statistics.

The explicit signs of connection to the UBS are:

1. The identification data of the BS does not match (e.g., a Mobile Country Code—MCC, a Mobile Network Code—MNC, a Local Area Code—LAC, a CellID);

2. Presence of more than one BS with the identical MCC, MNC, LAC and CellID in the signal range of a given MT;

3. The BS data (MCC, MNC, LAC, CellID) does not correspond to the real coordinates of the BS and/or the real coordinates of the MT.

According to the exemplary embodiment, the BS coordinates and identification data can be determined by the following actions:

request of the BS geo-location data from the service provider. This data can be compared against the current BS data or MT data;

acquiring the BS geo-location data from a BS database; and acquiring the BS geo-location data from a statistics database.

The BS database can be local (stored on the MT) or it can be remotely stored on a server.

The implicit signs of connection to the UBS are:

a lack of data encryption between the MT and the BS;

lack of response to an Unstructured Supplementary Service Data (USSD) request (or inability to execute the USSD request);

inability to use geo-location services of the service provided on the MT;

lack of packet connection;

lack of switching to another BS upon certain change of coordinates;

presence of only one BS in the MT signal receiving range;

presence of hidden connections between the MT and the BS (i.e., hidden from the user);

inability to establish connection with a remote server;

a long life span of a Temporary Mobile Subscriber Identity (TMSI), etc. (TMSI life span is set by a mobile operator).

Note that the implicit signs do not guarantee that the MT is connected to the UBS. However, the above signs taken in combination with other parameters can detect the UBS with a high probability. The module for control of the authenticity and security of mobile connections determines a security level of the data transmission. The module detects a type of the connection or presence of encryption (and a number of bits in the encryption key, if possible). If the encryption key is weak, the connection is considered unsafe.

According to the exemplary embodiment, the module for control of the authenticity of the Wi-Fi connections protects the user system from fake Wi-Fi access points (i.e., an ARP-spoofing). In order to detect the fake Wi-Fi access points, a table with correspondence between the MAC addresses of the access points and their Service Set Identifier (SSID) is used. If the MAC address changes without changing the SSID, this means that the system is already communicating with a different device. According to the exemplary embodiment, the protection algorithms use several independent conditions (or parameters). The algorithms can be implemented on any MT with a standard OS.

FIG. 1 illustrates a flow chart of an algorithm for detecting unauthorized base station (UBS), in accordance with the exemplary embodiment. In step 110, the system reads parameters of a current mobile network (e.g., MNC, MCC, CellId, LAC, etc.) and the connected MT. In step 120, the system checks for the explicit signs of the connection to the UBS. If at least one of the explicit signs is detected, the system detects the UBS in step 130.

Otherwise, in step 140, the system checks for the implicit signs of the connection to the UBS using a probability threshold value _0. If a probability K exceeds the threshold K0, the system detects the UBS in step 150. Note that the K0 can be set by the user or by the system configuration. Otherwise, the system performs additional checks in step 160. A number of the additional checks can be changed based on time and resource requirements. The system analyzes the results of the additional checks in step 160. If the probability K exceeds the threshold K1, the system detects the UBS in step 180. Otherwise the system determines that the MT is not connected to the UBS in step 190. The probability thresholds are defined by developers. They can be changed based on security policies.

Figure 2:
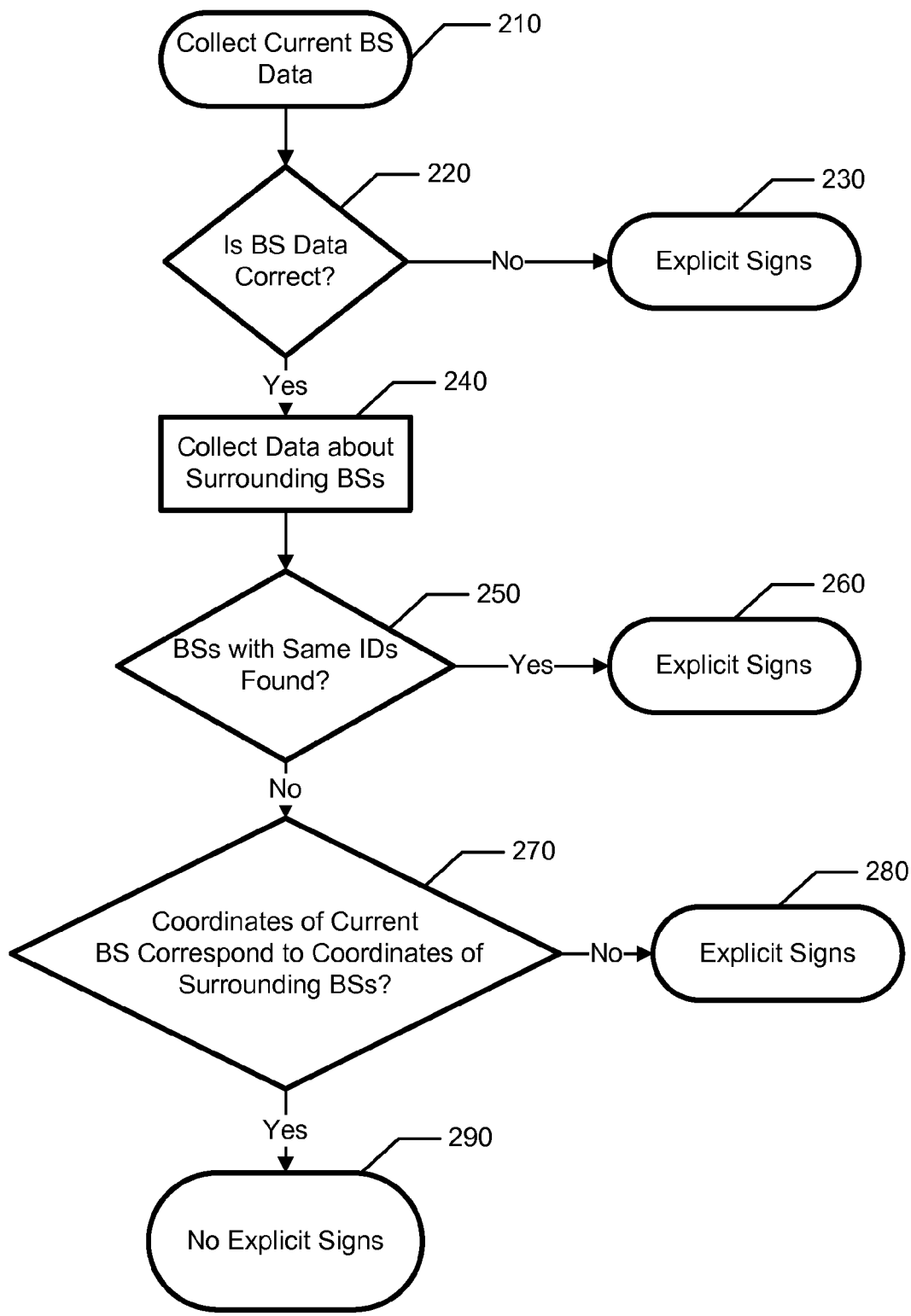
FIG. 2 illustrates a flow chart of an algorithm for detecting unauthorized base station (UBS) using explicit signs, in accordance with the exemplary embodiment.

FIG. 2 illustrates a flow chart of an algorithm for detecting unauthorized base station (UBS) using the explicit signs, in accordance with the exemplary embodiment. In step 210, the system collects the current BS data. The system checks if the BS data is correct in step 220. This check is implemented by checking the correspondence of the Mobile Country Code (MCC) and the current BS and the MCC of the TM; correspondence of the Mobile Network Code (MNC) to the mobile service provider; incorrect format of the BS identifier; correspondence of the BS identifier to the record in the BS table. The system can also check if the Local Area Code (LAC) does not change when the CellID does not change. Any of the above conditions are considered as an explicit sign of the UBS presence in step 230.

Otherwise, the system collects data about the surrounding BSs in step 240. If BSs with the same Cell IDs are found in step 250, the system considers it as an explicit sign of the UBS presence in step 260. Otherwise, in step 270, the system checks if coordinates of the current BS correspond to the coordinates of the surrounding BSs. If the coordinates do not correspond, the system considers it as an explicit sign of the UBS presence in step 280. Otherwise, the system determines that no explicit signs of the UBS exist in step 290.

Figure 3:
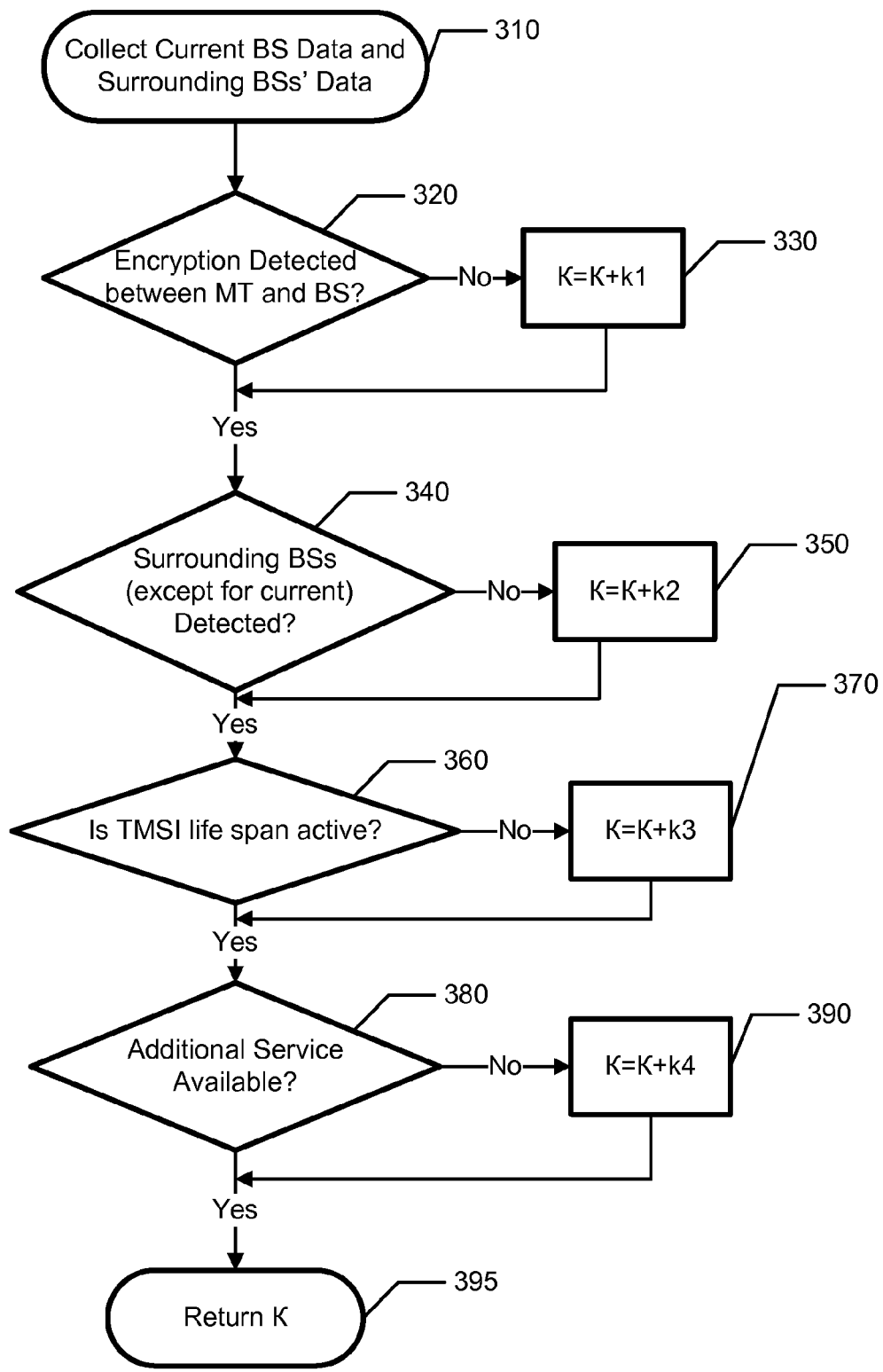
FIG. 3 illustrates a flow chart of an algorithm for detecting unauthorized base station (UBS) using implicit signs, in accordance with the exemplary embodiment.

FIG. 3 illustrates a flow chart of an algorithm for detecting unauthorized base station (UBS) using the implicit signs, in accordance with the exemplary embodiment. In step 310, the system collects a current BS data and surrounding BSs' data. In step 320, the system checks for the encryption between the MT and the BS. If no encryption is detected, the probability of the UBS presence is increased by K1 in step 330. Otherwise, the system checks for a presence of the surrounding BSs in step 340.

If the surrounding BSs are not detected, the probability of the UBS presence is increased by K2 in step 350. Otherwise, in step 360, the systems checks if the TMSI life span is active. If the TMSI life span is not active, the probability of the UBS detection is increased by K3 in step 370. Otherwise, in step 380, the system checks if an additional service is available (e.g., GPRS, USSD, SMS, MMS, etc.). Note that the system checks not only the services, but their responses as well. If the additional services demonstrate some incorrect data, the probability of the UBS detection is increased by K4 in step 390. Otherwise, the system returns the probability value K in step 395. The coefficients Ki are set by the system configuration. Note that the signs of connection to a UBS are not equal. The probability coefficients Ki determine the weight of each of the UBS sign. The coefficients Ki are set by the developers, but can also be changed by the users.

The encryption is turned on by a command sent from the BS to the MT. The command contains encryption algorithm. The encryption can be turned off by either the service provider or by the MT (if the MT does not support the encryption). Lack of encryption in the communication channel can result in passive intrusion when a third party listens in on all the communications while being undetected. In case of the UBS, the encryption is not possible, because the UBS does not know the encryption key stored on the SIM card of the MT.

Lack of other BSs within the MT signal range can indicate that the MT is connected to the UBS and that the other BSs are possibly muted by signal suppression means. However, it may also indicate that there is only one BS in range. A noise level of other mobile channels can be checked. If the noise level exceeds a special threshold (in dBm, a measure of a signal power), the signal suppression is present, which can indicate the UBS connection.

The mobile service providers have a set time intervals for changing the Temporary Mobile Subscriber Identity (TMSI). The UBS cannot keep the same time intervals. In order to detect the UBS, the system checks if an additional service is available (e.g., GPRS, USSD, SMS, etc.). According to the exemplary embodiment, the system checks not only the services, but their responses as well. For example, in case of the GPRS, if the IP address is not within the operator's normal range, it can indicate that the UBS connection is present. Note that the IP address can be acquired form open sources (i.e., Internet, local and remote databases). In case of the SMS/MMS, the lack of delivery notifications or incorrect data can also indicate the UBS connection.

Figure 4:
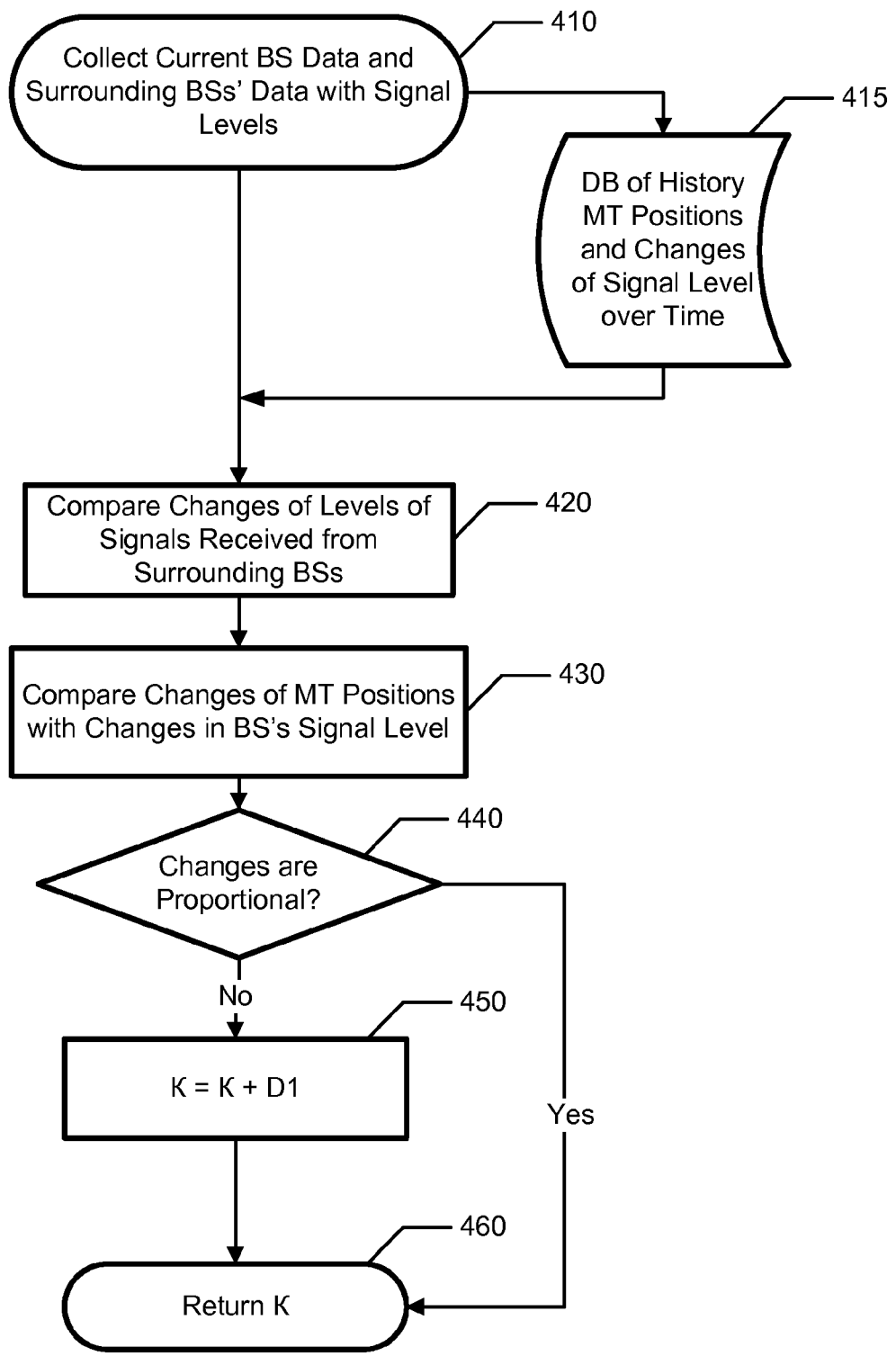
FIG. 4 illustrates a flow chart of an algorithm for detecting unauthorized base station (UBS) using the additional check, in accordance with the exemplary embodiment.

FIG. 4 illustrates a flow chart of an algorithm for detecting unauthorized base station (UBS) using the additional check, in accordance with the exemplary embodiment. In step 410, the system collects a current BS data and surrounding BSs' data including the signal levels. The system acquires the data reflecting changes of the signal levels from a history database in step 415. In step 420, the system compares the changes of signal levels of the surrounding BSs.

In step 430, the system compares changes of MT positions with the changes in the BSs signal levels. If the changes are proportional in step 440, this means that none of the BSs are moving. The majority of the real BSs are stationary, while the UBSs can move. If the changes are proportional, in step 440, the system returns a value K of UBS detection probability in step 460. Otherwise, the UBS detection probability is increased by D1 in step 450. Note that even if the mobile device moves, the BS signal changes proportionally. The UBS signal remains the same, while other BS signals change.

Figure 5:
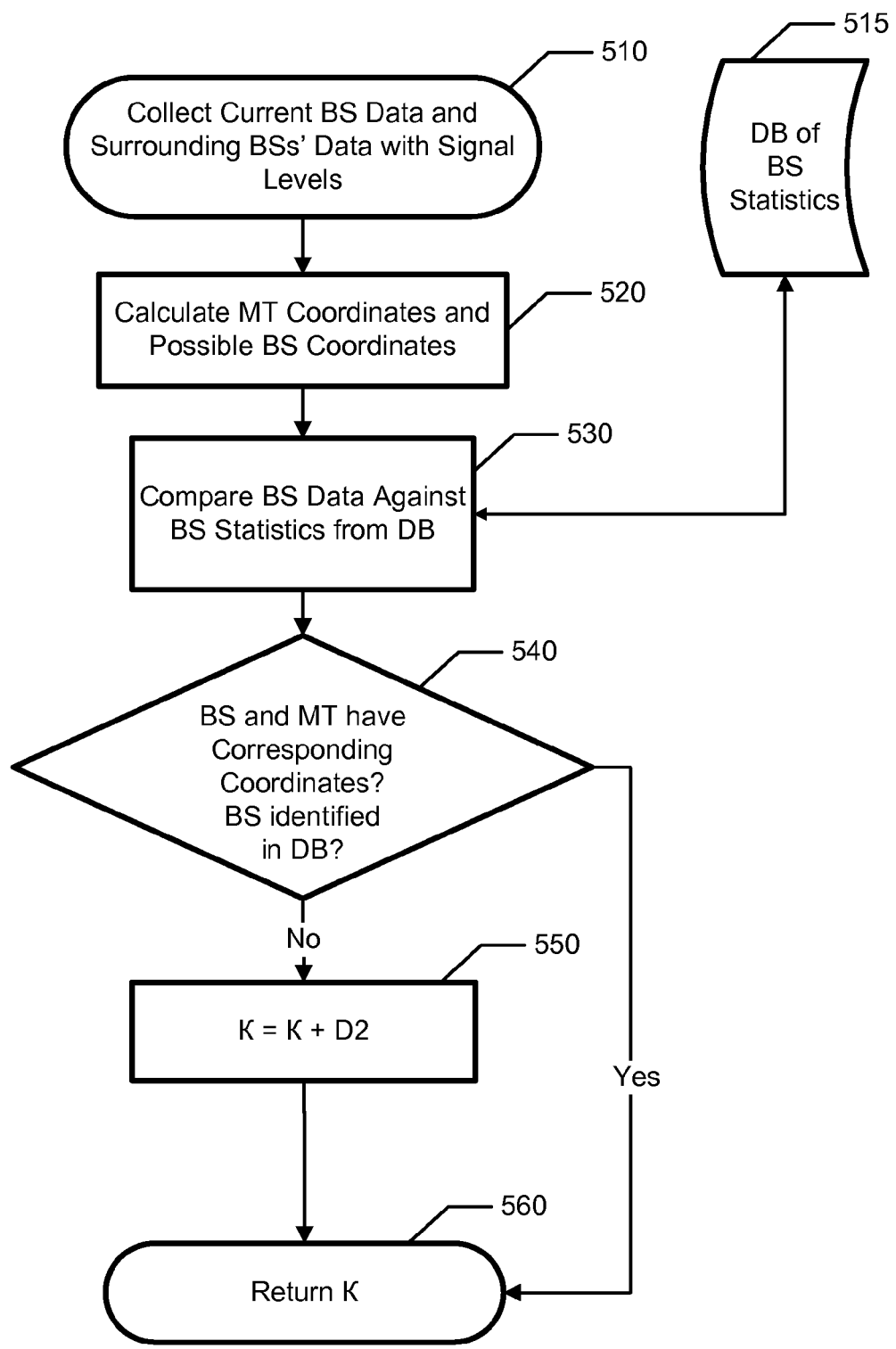
FIG. 5 illustrates a flow chart of an algorithm for detecting unauthorized base station (UBS) using another additional check in accordance with the exemplary embodiment.

FIG. 5 illustrates a flow chart of an algorithm for detecting unauthorized base station (UBS) using another additional check in accordance with the exemplary embodiment. In step 510, the system collects a current BS data and surrounding BSs' data including the signal levels. In step 520, the system calculates MT coordinates and possible BS coordinates. In step 530, the system compares the BS data against the BS statistics collected into a database in step 515. In step 540, the system checks if the BS and MT coordinates do not correspond to each other or if the BS is not in the database. Then, the system increases the UBS detection probability by D2 in step 550. In step 560, the system returns the UBS detection probability K.

This check uses BS (towers) coordinates received from third parties or from the statistics database. A list of the BSs for current MT position is known and an appearance of a "new" BS with different coordinates (or BS absent from the database) can indicate the presence of the UBS. The database has to have up to date information in order to detect the UBS.

According to the exemplary embodiment, another additional check can be performed. This additional check allows for detection of the UBS with a limited functionality. A subscriber status request is sent to a mobile service provider via Wi-Fi. If the subscriber is not registered, the request returns "1" multiplied by a special probability coefficient. Otherwise the request returns "0."

The module for controlling the authenticity of the Wi-Fi connection controls parameters of the Wi-Fi connection and detects unauthorized changes. The module periodically checks parameters of the Wi-Fi access point and writes them into a database for subsequent comparison. An external database containing a black list or a white list of the Wi-Fi access points (with their coordinates and additional data) can be used.

Figure 6:
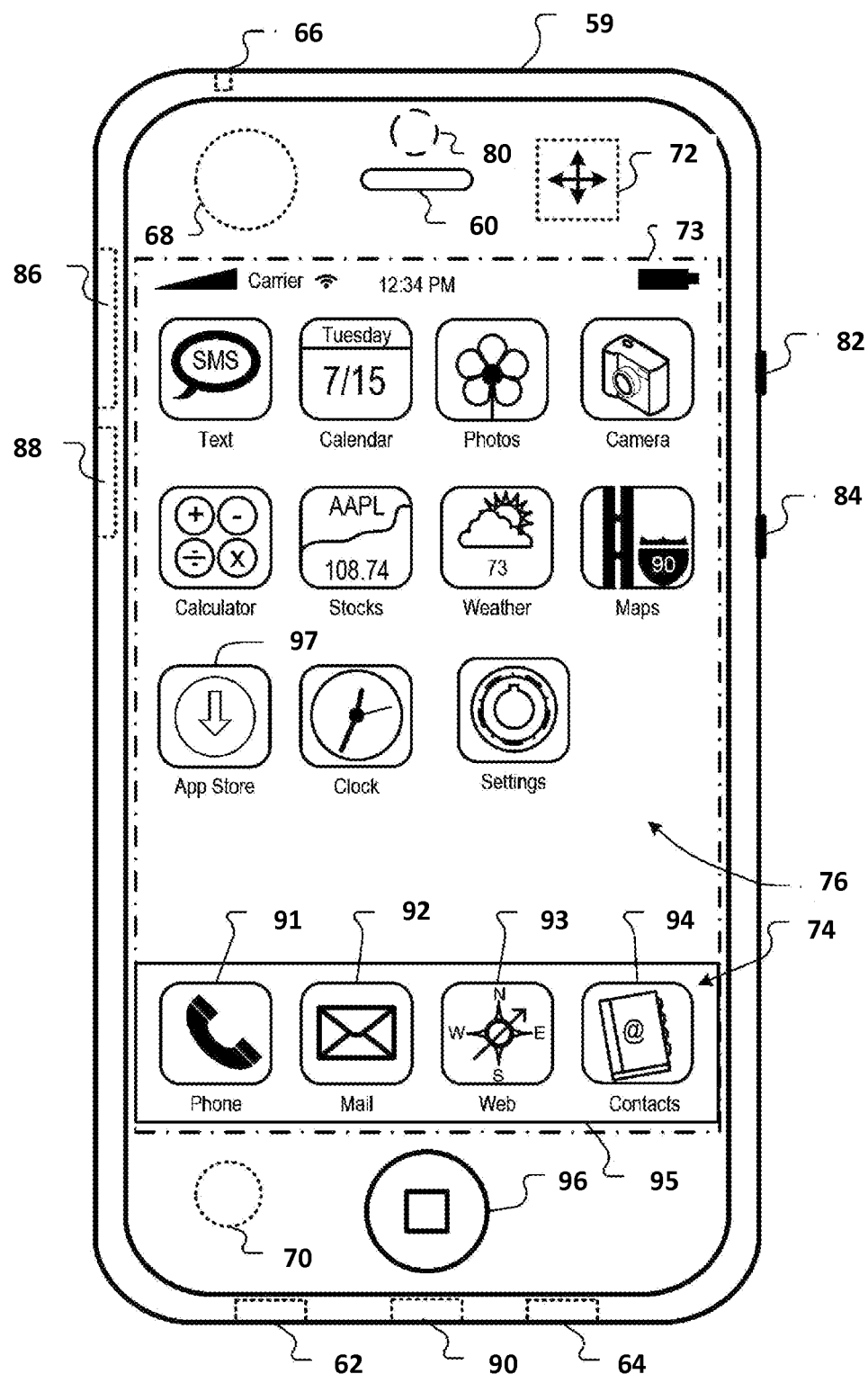
FIG. 6 is a block diagram of an exemplary mobile device that can be used in the invention.

FIG. 6 is a block diagram of an exemplary mobile device 59 on which the invention can be implemented. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be also sensitive to tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94.

In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape.

In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video. The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 7:
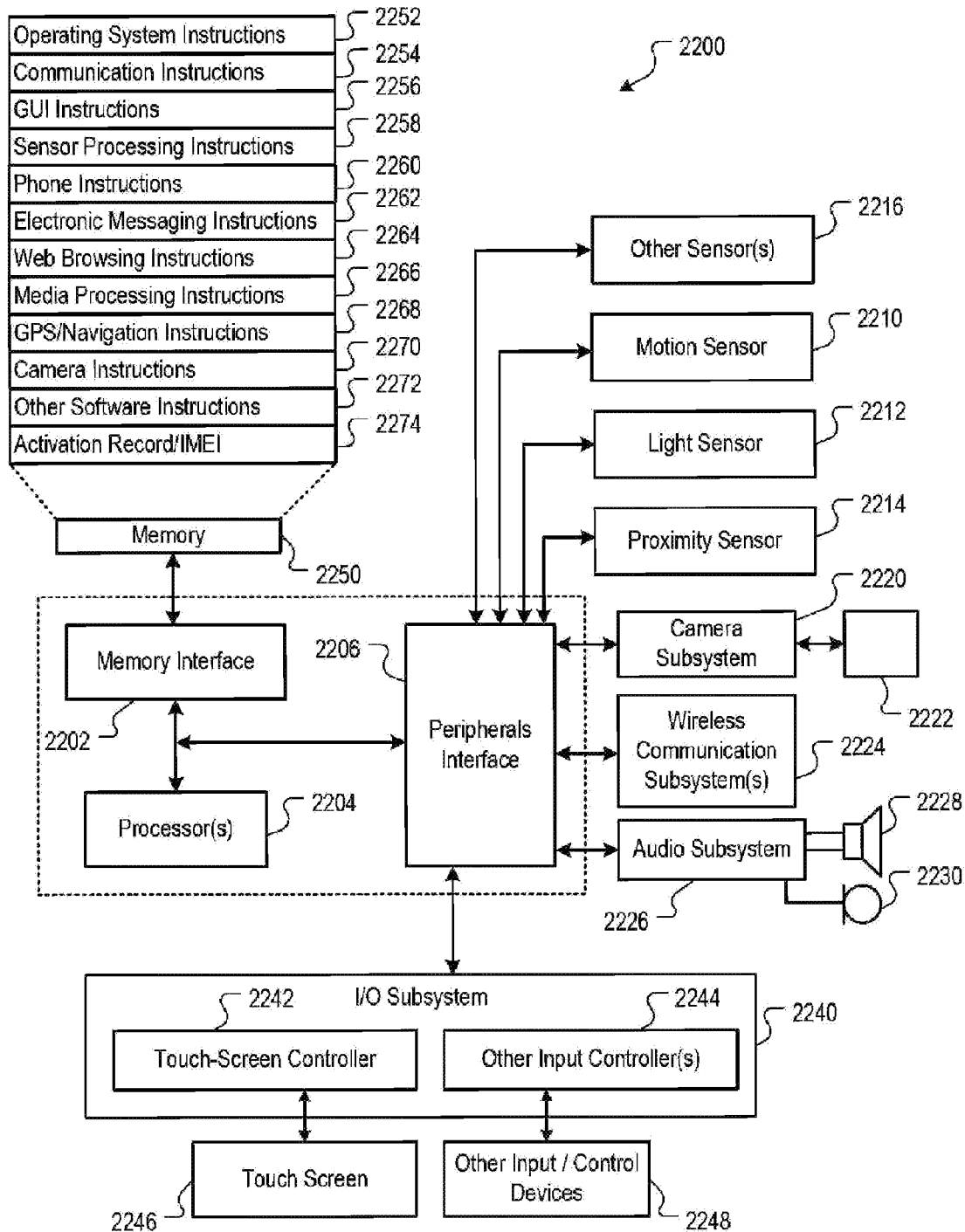
FIG. 7 is a block diagram of an exemplary implementation of the mobile device.

FIG. 7 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate.

For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices. An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246.

The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Figure 8:
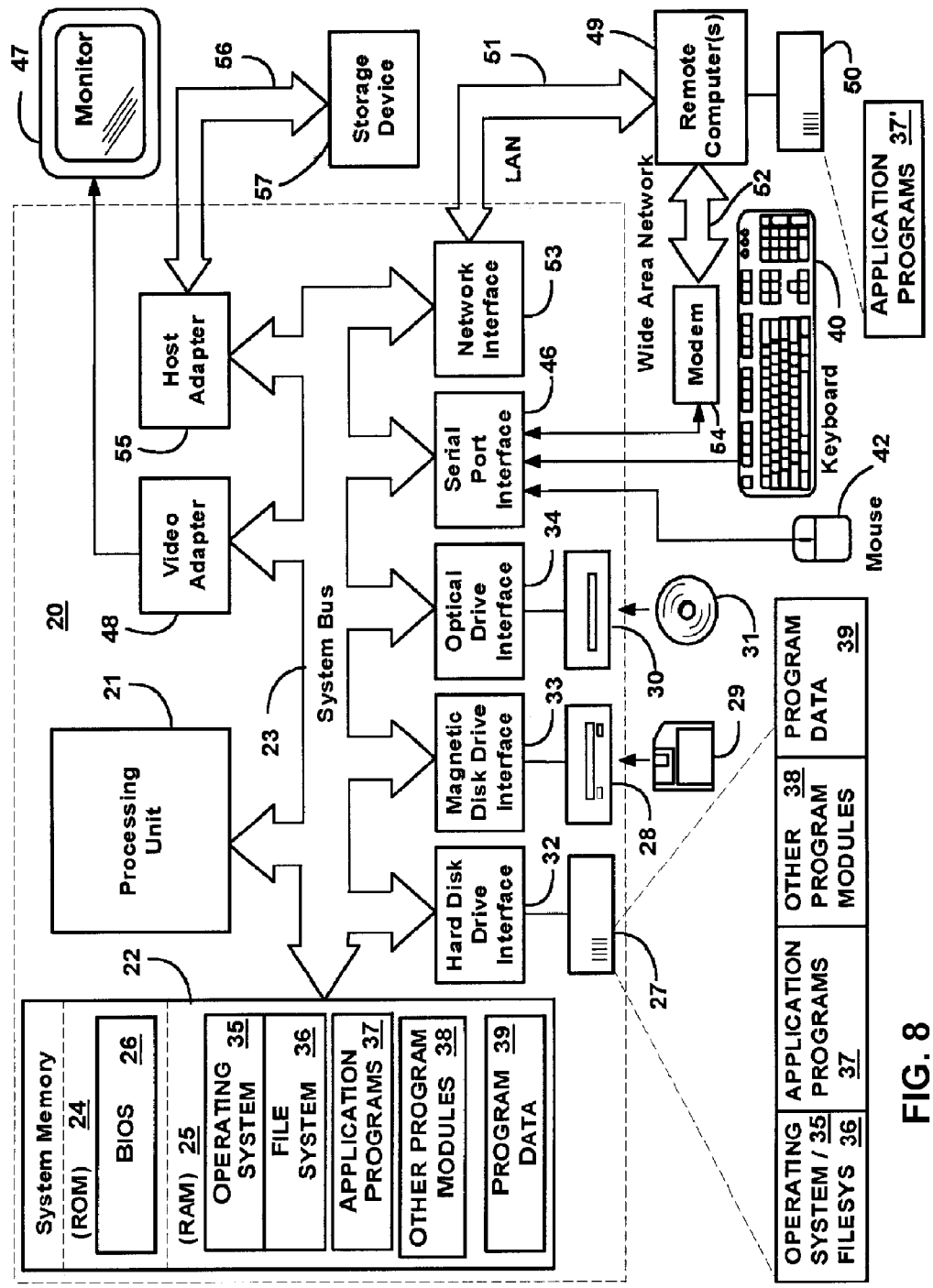
FIG. 8 illustrates a schematic of an exemplary computer system or a server that can be used for implementation of the invention.

With reference to FIG. 8, an exemplary system for implementing the invention includes a general purpose computing device in the form of a computer/server 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The server 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for efficient detection of unauthorized base stations.

It should also be appreciated that various modifications, adaptations and alternative embodiments thereof may be made within the scope and spirit of the present invention. The invention is further defined by the following claims.

What is claimed is:

1. A system for controlling communications between a mobile terminal (MT) and a current base station (BS), the system comprising:
   a mobile terminal (MT) having a mobile Operating System (OS) configured to connect to a current base station;
   a control module configured to detect changes in a mobile network;
   wherein the control module detects a presence of an unauthorized base station (UBS) based on any of the following events:
   a change of a Mobile Network Code (MNC) without a corresponding change of a mobile service provider;
   a presence of two BSs with an identical Cellular Identification (CellID) located within a signal range of the MT.

2. The system of claim 1, wherein the control module is configured to notify a mobile subscriber of the detected changes in the mobile network, including changes of mobile communication standards.

3. The system of claim 1, wherein the control module is configured to notify a remote server of the detected changes in the mobile network.

4. The system of claim 1, wherein the control module is configured to detect the presence of the UBS connected to the MT based on:
   a Temporary Mobile Subscriber Identity (TMSI) life span exceeds a pre-set threshold.

5. The system of claim 1, wherein the control module is configured to detect the presence of the UBS connected to the MT based on any of the following:
   lack of service messages from a mobile service provider;
   lack of encryption between the MT and the current BS;
   inability to connect to a remote server;
   lack of a hand over to another BS when location data of the MT changes;
   detection of a new BS which does not have any data in a statistic database; and
   detection of a current BS located further from the MT than a signal range.

6. The system of claim 1, wherein the control module is configured to detect the presence of the UBS connected to the MT based on any of the following:
   availability of Location-Based Service (LBS); and
   analysis if results of execution of an Unstructured Supplementary Service Data (USSD) request,
   wherein if the LBS is unavailable, the probability of detection of the UBS is increased, and
   if the USSD request does not produce a response, the probability of detection of the UBS is increased.

7. The system of claim 1, wherein the system is configured to survey MT microphone for its availability and, if the microphone is not available, to check an MT user interface for messages indicating microphone related issues, wherein if the microphone is not available, the system determines that a hidden call is taking place.

8. The system of claim 1, wherein the control module is configured to control an authenticity of the Wi-Fi connections configured to collect Service Set Identifier (SSID) and Multimedia Access Control (MAC) address data and configured to protect a user of the MT from Address Resolution Protocol (ARP)-spoofing.

9. The system of claim 1, wherein the control module also detects the presence of the UBS based on a mismatch between the current BS identifier and a BS identifier stored in a BS data table.

10. The system of claim 1, wherein the control module also detects the presence of the UBS based on a change of a Local Area Code without a corresponding change of the CellID.

11. The system of claim 1, wherein the control module is also configured to detect the presence of the UBS connected to the MT based on an incorrect delivery status of Simple Messaging System (SMS) and Multimedia Messaging System (MMS) data.

12. The system of claim 1, wherein the control module is also configured to detect the presence of the UBS connected to the MT based on a presence of only one BS in the mobile network.

13. The system of claim 1, wherein the control module is also configured to detect the presence of the UBS connected to the MT based on a presence of hidden service connections between the BS and the MT.

14. The system of claim 1, wherein the control module detects a presence of an unauthorized base station (UBS) based on a mismatch between a Mobile Country Code (MCC) received by the MT from the network and an MCC of a country where the MT is located.

15. A system for controlling communications between a mobile terminal (MT) and a current base station (BS), the system comprising:
   a mobile terminal (MT) having a mobile Operating System (OS) and configured to connect to the current base station (BS);
   a network statistics collection module configured to detect changes in a mobile network and to identify any unauthorized BSs based on the detected changes,
   wherein the network statistics collection module collects data related to connections times to the available BSs and identifies substitution of the BS by an unauthorized BS using assembled network error statistics data related to any of:
   time and location of a connection failure indicating an incorrect completion of a call, and
   base station handover indicating the MT switching to another BS upon completion of a call but not switching to another BS with better signal quality.

16. The system of claim 15, wherein the network statistics collection module collects data related to Simple Messaging System (SMS) delivery/failures time and a status and a time of voice connections.

17. The system of claim 15, wherein the system is configured to send statistics data to a processing server and receive analyses of the statistics data from the server.

18. The system of claim 15, wherein the system is configured to send statistics data to a processing server and receive analysis data from the server.

19. The system of claim 15, wherein the system is configured to collect MT battery charge-related data.

20. The system of claim 15, wherein the network statistics collection module also collects data related to connections times to the available BSs and collects connection statistics data related to any of:
   network parameters prior to the connection failure; and
   network parameters after the connection failure.

21. A computer-implemented method for detecting a connection to an unauthorized base station (UBS), the method comprising:
   reading parameters of a mobile terminal (MT);
   acquiring a current base station (BS) data;
   checking for explicit signs of connection to the UBS;
   checking for implicit signs of connection to the UBS, if no explicit signs are detected;
   checking for indications of jamming of other base stations;
   performing additional checks, if no implicit signs are detected, wherein the additional checks are any of:
   availability of Location-Based Service (LBS); and
   analysis if results of execution of an Unstructured Supplementary Service Data (USSD) request,
wherein:
   if the LBS is unavailable, the probability of detection of the UBS is increased, and
   if the USSD request does not produce a response, the probability of detection of the UBS is increased;
   analyzing results of the additional checks; and
   determining if the BS is the UBS based on the results of the additional checks.

22. A system for controlling communications between a mobile terminal (MT) and a current base station (BS), the system comprising:
   a mobile terminal (MT) having a mobile Operating System (OS) configured to connect to a current base station;
   a control module configured to
   (i) detect changes in a mobile network,
   (ii) collect MT battery charge-related data as indicative of a connection to an unauthorized base station (UBS); and
   (iii) to survey MT microphone for its availability and, if the microphone is not available, to check an MT user interface for messages indicating microphone related issues, wherein if the microphone is not available, the system determines that a hidden call is taking place; and
   wherein the control module also detects a presence of a UBS based on the following events:
   (a) a change of a Mobile Network Code (MNC) without a corresponding change of a mobile service provider; and
   (b) a presence of at two BSs with an identical Cellular Identification (CellID) located within a signal range of the MT.

\* \* \* \* \*